(12) United States Patent
Liu et al.

(10) Patent No.: US 8,958,075 B2
(45) Date of Patent: Feb. 17, 2015

(54) SWING-STYLE AND HIGH SIGNAL-TO-NOISE RATIO DEMODULATION DEVICES AND CORRESPONDING DEMODULATION METHOD FOR THE MEASUREMENT OF LOW COHERENCE INTERFERENCE DISPLACEMENT

(75) Inventors: Tiegen Liu, Tianjin (CN); Junfeng Jiang, Tianjin (CN); Jinde Yin, Tianjin (CN); Kun Liu, Tianjin (CN); Shaohua Wang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 13/880,730

(22) PCT Filed: May 28, 2012

(86) PCT No.: PCT/CN2012/076145
§ 371 (c)(1),
(2), (4) Date: Apr. 20, 2013

(87) PCT Pub. No.: WO2013/020407
PCT Pub. Date: Feb. 14, 2013

(65) Prior Publication Data
US 2014/0176959 A1    Jun. 26, 2014

(30) Foreign Application Priority Data
Aug. 9, 2011 (CN) .......................... 2011 1 0226963

(51) Int. Cl.
*G01B 9/02* (2006.01)
*G02B 6/293* (2006.01)
*G02B 6/32* (2006.01)
*G02B 5/30* (2006.01)

(52) U.S. Cl.
CPC ............ *G01B 9/0209* (2013.01); *G02B 5/3083* (2013.01); *G02B 2207/117* (2013.01); *G01B 9/02065* (2013.01); *G01B 9/02057* (2013.01); *G02B 6/29302* (2013.01); *G02B 6/32* (2013.01)
USPC .......................... 356/479; 356/482; 356/493

(58) Field of Classification Search
CPC ........... G01B 9/02034; G01B 9/02035; G01B 9/02065; G01B 9/0209; G01B 2290/70; G02B 6/29302; G02B 2207/117
USPC ......................................... 356/479, 482, 493
See application file for complete search history.

(56) References Cited

U.S. PATENT DOCUMENTS

| | | | |
|---|---|---|---|
| 7,426,036 B2 * | 9/2008 | Feldchtein et al. | ........... 356/479 |
| 7,428,053 B2 * | 9/2008 | Feldchtein et al. | ........... 356/479 |
| 7,732,750 B2 * | 6/2010 | Dowski et al. | ................ 250/216 |

FOREIGN PATENT DOCUMENTS

CN             102052902 A    *    5/2011

* cited by examiner

*Primary Examiner* — Michael A Lyons
(74) *Attorney, Agent, or Firm* — George G. Wang; Bei & Ocean

(57) ABSTRACT

Swing-style demodulation device for measuring displacement information, including (1) a broadband light source, (2) an optical circulator, (3) GRIN lens, (4) a fixed mirror on an object under test, (5) a collimating device, (6) a rotating mirror, (7) f-θ lens, (8) a polarizer, (9) a narrow strip shaped birefringent wedge, (10) a polarization analyzer, and (11) a signal acquisition system.

9 Claims, 4 Drawing Sheets

SWING-STYLE AND HIGH SIGNAL-TO-NOISE RATIO DEMODULATION DEVICES AND CORRESPONDING DEMODULATION METHOD FOR THE MEASUREMENT OF LOW COHERENCE INTERFERENCE DISPLACEMENT

FIELD OF THE INVENTION

This invention relates to demodulation of displacement information. The presented demodulation technique for displacement sensing information is highly accurate and applicable for the measurement of displacement, or parameters that can be converted into displacement, such as strain, temperature, thickness, group refractive index and compression stress.

BACKGROUND OF THE INVENTION

Low coherent interference technique for the demodulation of displacement information mainly comprises two methods, that is, time scanning and spatial scanning. In the time scanning method written by M. Song et al., (M. Song, Byoungho Lee, An effective optical evaluation technique using visible low-coherence interferometer, Optics and Lasers in Engineering, 1997, 27: 441-449), the displacement information is obtained by scanning the optical path difference of one of the arms of Michelson interferometer. In the spatial scanning method, the displacement information is converted into a linear distribution of spatial optical path difference and received by a CCD linear array. In order to obtain the spatial distribution of optical path difference using the above stated scanning methods. Chen et al. proposed a Fizeau interferometer in 1991 and Marshall et al. proposed a Mach-Zehnder interferometer in 1996 (S. Chen et al., Study of electronically-scanned optical-fiber white-light Fizeau interferometer, Electronics letters, 1991. 27(12):1032-1034; R. Marshall et al., A novel electronically scanned white-light interferometer using a Mach-Zehnder approach, Journal of Lightwave Technology, 1996. 14(3): 397-402).

The time scanning method is capable of measuring displacement in a large scope, but its long-term reliability and stability is poor. In addition, the accuracy of the obtained data is limited to micron level. The space scanning method has the advantages of long-term reliability, by using linear CCD array for electric scanning. However, the scanning light beam covers entire CCD photosensitive surface, which results in a spread of light energy and low signal-noise ratio.

SUMMARY OF THE INVENTION

This invention aims to overcome the deficiencies of the previous arts, and to provide a swing-style and high signal-to-noise ratio low coherence interference demodulation device and the corresponding demodulation method for the measurement of displacement. The demodulation technique has all the advantages of traditional time and space scanning methods and brings out two demodulation devices correspondingly. In this invention, a collimated thin light beam with a high-energy concentration is applied for the scanning of the optical path difference, along a narrow strip shaped birefringent wedge. Hence, the interference fringe with a high signal-to-noise ratio may be obtained and a high measurement accuracy is thus achieved.

The first swing-style and high signal-to-noise ratio low coherence interference demodulation device for the measurement of displacement consists of 12 parts:

1) Light source preferably broadband light source with wide spectrum including LED, SLD and halogen lamps;
2) Optical circulator which functions to send the light from the light source to the test object and collects the reflected signal light; and an optical coupler may be used in case that the power of the light source is high.
3) Optical fiber collimator for collimating and outputting the light beam from the optical circulator, and for partially reflecting the light by the reflective film coated thereon;
4) Fixed reflective mirror fixed on the test object, for reflecting optical signals output by the GRIN lens; and the fixed reflective mirror is a reflective element such as planar mirror and prism of corner cube;
5) Collimating device for collimating the signal light reflected from the GRIN lens into a thin beam, and sending the light beam to a rotating mirror;
6) Rotating mirror for reflecting the collimated thin beam to a polarization interference system. The scanning of the thin beam along the thickness variation direction of the optical wedge is performed by swinging the rotating mirror, and the scanning covers all the pixels of the CCD linear array.
7) f-θ lens: conducts a parallel scan using the thin beam, along the longitudinal direction of the narrow strip shaped birefringent wedge, in which the reflection point of the rotating mirror coincides with the f-θ lens focus.
8) Polarizer: is used to polarize the signal light from the f-θ lens, where the angle between the polarizing direction and the optical axis of narrow strip shape birefringent wedge is 45°;
9) Narrow strip shaped birefringent wedge: turns the linearly polarized light beam into two orthogonal beams, and the two linearly polarized light beams have a linearly distributed spatial optical path difference along the thickness variation direction of optical wedge;
10) Polarization analyzer: projects the two orthogonal linearly polarized light beams to generate interference, in which the polarization direction is parallel or perpendicular to the polarizer;
11) Linear camera array: a CCD or CMOS linear array, to collect the interference fringes produced by the polarization analyzer;
12) Data processing unit: a computer or an embedded computing system, to process the collected interference fringes data and obtain the displacement information of the test object.

The second swing-style and high signal-to-noise ratio low coherence interference demodulation device for the measurement of displacement consists of 14 parts:

1) Light source: is a broadband light source with wide spectrum, such as LED, SLD and halogen lamps;
2) Optical circulator: sends the light from the light source to the test object and collects the reflected signal light, and an optical coupler may be used in case that the power of the light source is high;
3) GRIN lens: is used to collimate and output the light beam from the optical circulator and to partially reflect the light by the electroplated end surface;
4) Fixed mirror fixed on the test object, for reflect optical signals from the GRIN lens;
5) Collimating device: collimates the signal light reflected from the GRIN lens into a thin beam, and sends the light beam to a rotating mirror;
6) Rotating mirror: reflects the collimated thin beam to a polarization interference system. The scanning of the thin beam along the thickness variation direction of the optical wedge is performed by swinging the rotating mirror, and the scanning covers all the pixels of the CCD linear array.

7) f-θ lens: conducts a parallel scan using the thin beam, along the longitudinal direction of the narrow strip shaped birefringent wedge, in which the reflection point of the rotating mirror coincides with the f-θ lens focus.
8) Polarizer: is used to polarize the signal light from the f-θ lens, where the angle between the polarizing direction and the optical axis of narrow strip shape birefringent wedge is 45°;
9) Narrow strip shaped birefringent wedge: turns the linearly polarized light beam into two orthogonal beams, and the two linearly polarized light beams have a linearly distributed spatial optical path difference along the thickness variation direction of optical wedge;
10) Polarization analyzer: projects the two orthogonal linearly polarized light beams to generate interference, in which the polarization direction is parallel or perpendicular to the polarizer;
11) Micropore linear array: controls the sampling position when the light beam scans;
12) Focusing lens: focuses the light beams, passing through the micropore linear array, into one point;
13) PIN detector: receives the focused optical signals, and converting the light signals into electric signals;
14) Data processing unit: a desktop computer or an embedded computing system, to process the collected interference fringes data and obtain the displacement information of the test object.

The optical devices stated in the above systems can be replaced by the corresponding free space optical devices.

This invention also provides a demodulation method for displacement information obtained by the devices stated above, which comprises the following steps:

Step 1: Light from the broadband source light passes the optical circulator to the GRIN lens. Part of the light is reflected by the coated end surface of the GRIN lens. The other part of the light passes the lens and arrives at a reflection mirror fixed on the test object. These reflected lights are coupled into optical fiber. There is an optical path difference $d_s$ between lights reflected from the coated end surface of GRIN lens and from the fixed mirror on the test object, where $d_s$ equals twofold of the distance between the GRIN lens and mirror fixed on the test object.

Step 2: The two reflected lights form a thin light beam via a collimating device, after being coupled into optical fiber and passing through an optical circulator. The collimated thin light beam goes to a scanning device that comprises a rotating mirror and a f-θ lens, in which the reflection point of the rotating mirror consistently coincides with the focus of the f-θ lens. When the rotating mirror swings at angular speed ω in the range of ±θ, the thin light beam scans in the range of ±2θ. After passing through the f-θ lens, the thin light beam parallel scans along the longitudinal direction of the narrow strip shaped birefringent wedge, at speed v and in the range of L=2f×tan(2θ). The value of L is adjustable by varying the swinging angle θ and the focal length f of the f-θ lens. Since the energy of the thin light beam is highly concentrated, high signal-to-noise interference fringe signals thus can be achieved.

Step 3. The signal light from the f-θ lens is further processed into linearly polarized light via a polarizer, where the angle between the polarizing direction and the optical axis of the birefringent wedge is 45o. Then the narrow strip shaped birefringent wedge evenly turns the linearly polarized light beam into two orthogonal components, namely ordinary and extraordinary lights. An optical path difference $d_r=(n_e-n_o)d$ is formed between the two components, where $n_e$ is the optical refractive index of the extraordinary light, and $n_o$ is the optical refractive index of the ordinary light. The thickness of optical wedge can be expressed by equation $d(x)=x\tan\alpha$, where x is the lateral distance from the incident light to the birefringent wedge vertex, and α is the wedge angle.

Step 4. The spatial distribution of optical path difference is obtained by successive scan using the thin light beam and the displacement information of the test object can be calculated by optical path difference matching. Finally, interference fringes are produced after the two orthogonal linearly polarized light beams passed through the polarization analyzer, inclined at 45o to the optical axis of the narrow strip shaped birefringent wedge.

Step 5: For the first device, the interference fringes are received by a linear camera array (e.g. linear CCD array) and the designed scanning range covers all the pixels of the linear camera array. The obtained signals are transferred to a data processing unit. The location of the interference fringe peak at the linear camera array is used as the matching reference point and the displacement information thus can be demodulated, after processing the interference fringes. This device is designed to deal with the interference fringes generated by the visible broadband light sources.

Step 6: For the second device, the light beams first pass through a linear micropore array, then focus to a PIN photodetector using a focus lens. The obtained signals are transferred to a data processing unit. The location of the interference fringe peak at the linear micropore array is used as the matching reference point and the displacement information thus can be demodulated, after processing the interference fringes. This device is capable to receive the interference fringes generated by near-infrared broadband light sources.

The advantages of this invention are as follows:

1. This invention provides a novel space scanning method using a thin light beam for the low coherence interference demodulation of displacement. A high resolution is achieved by scanning the optical path difference using a thin light beam along the longitudinal direction of the narrow strip shaped birefringent wedge, and maintaining the received light spot at a consistent spatial position using a linear camera array or micropore array. In addition, a high signal-to-noise ratio is achieved, since the influence of outside noise on the thin light beam having concentrated energy is negligible.

2. This invention provides two devices for receiving interference information. One uses linear camera array (e.g. CCD and CMOS) to receive interference information, which is applicable when the spectrum of the broadband light source falls within the camera sensitive limits, for instance visible light waveband or light wavebands of which the wavelength is less than 1100 nm. The other device uses PIN photoelectric detector to receive interference information, which is applicable for near-infrared broadband light sources.

In the attached drawings, 1 is the broadband light source, 2 is the optical circulator, 3 is the GRIN lens, 4 is the fixed mirror, 5 is the collimating device, 6 is the rotating mirror, 7 is the f-θ lens, 8 is the polarizer, 9 is the narrow strip shaped birefringent wedge, 10 is the polarization analyzer, 11 is the linear camera array, 12 is the computer, 13 is the linear micropore array, 14 is the focusing lens, and 15 is the PIN photoelectric detector.

DETAILED DESCRIPTION OF PARTICULAR EMBODIMENTS OF THE INVENTION

Figure 1:
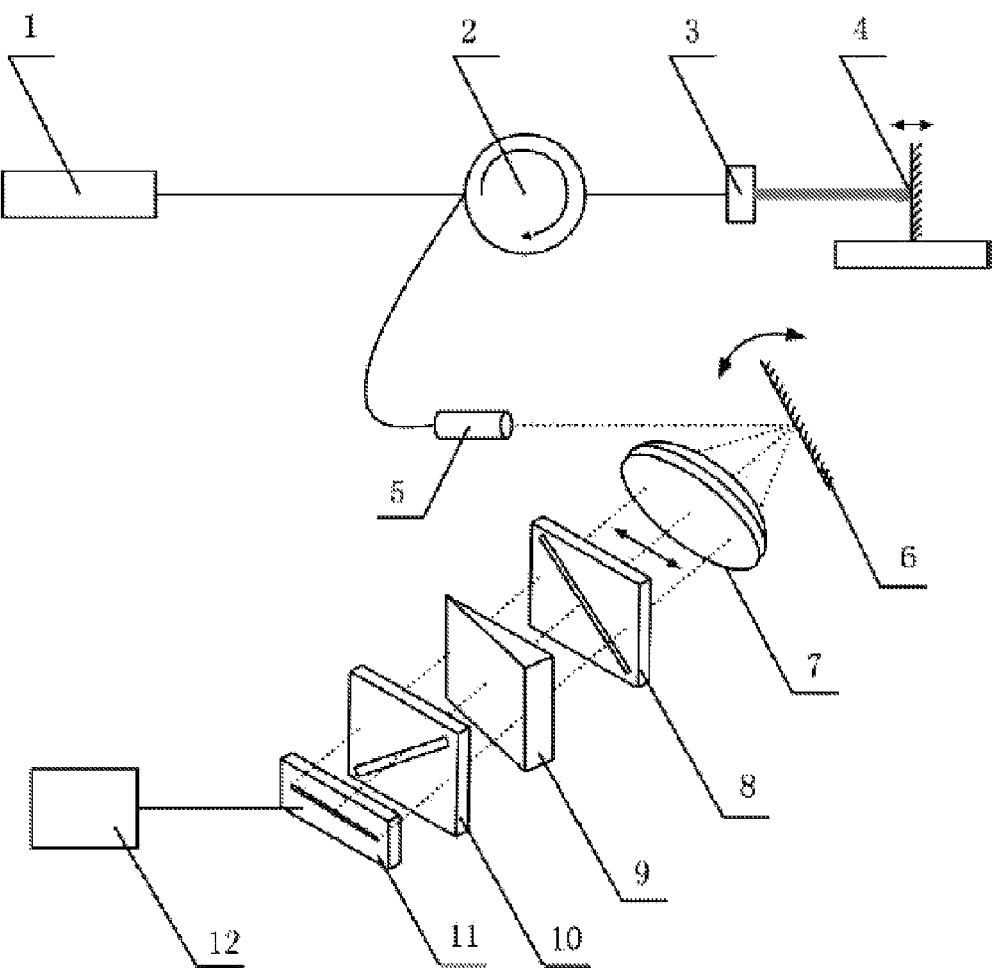
FIG. 1 is the schematic diagram of the first swing-style and high signal-to-noise ratio low coherence interference demodulation device for the measurement of displacement.

Embodiment 1: The first swing-style and high signal-to-noise ratio low coherence interference demodulation device for the measurement of displacement As shown in FIG. 1, the light from the broadband light source 1 passes through the optical circulator 2 and arrives at the GRIN lens 3.

Part of the light is reflected by the coated end surface of the GRIN lens 3, and the other part goes to the fixed mirror 4 installed on the test object. The two reflected light beams later are combined into one beam by optical fiber.

After passing through the optical circulator 2, part of the reflected light travels to collimating device 5 and turns into a thin light beam. The thin light beam is reflected by the rotating mirror 6 and travels through the f-θ lens 7, in which the reflection point of the rotating mirror 6 coincides with the focus of the f-θ lens 7.

By swinging the rotating mirror 6, the thin beam scans along the longitudinal direction of the narrow strip shaped birefringent wedge 9.

The light from the f-θ lens 7 incident to the polarizer 8 and forms a linearly polarized light beam, inclining 45° to the optical axis of optical wedge.

The linearly polarized light beam passes through the narrow strip shaped birefringent wedge 9 and arrives at the polarization analyzer 10 for projection interference. The interference signals from the polarization analyzer 10 are received by the linear camera array 11 and input to computer 12.

Figure 2:
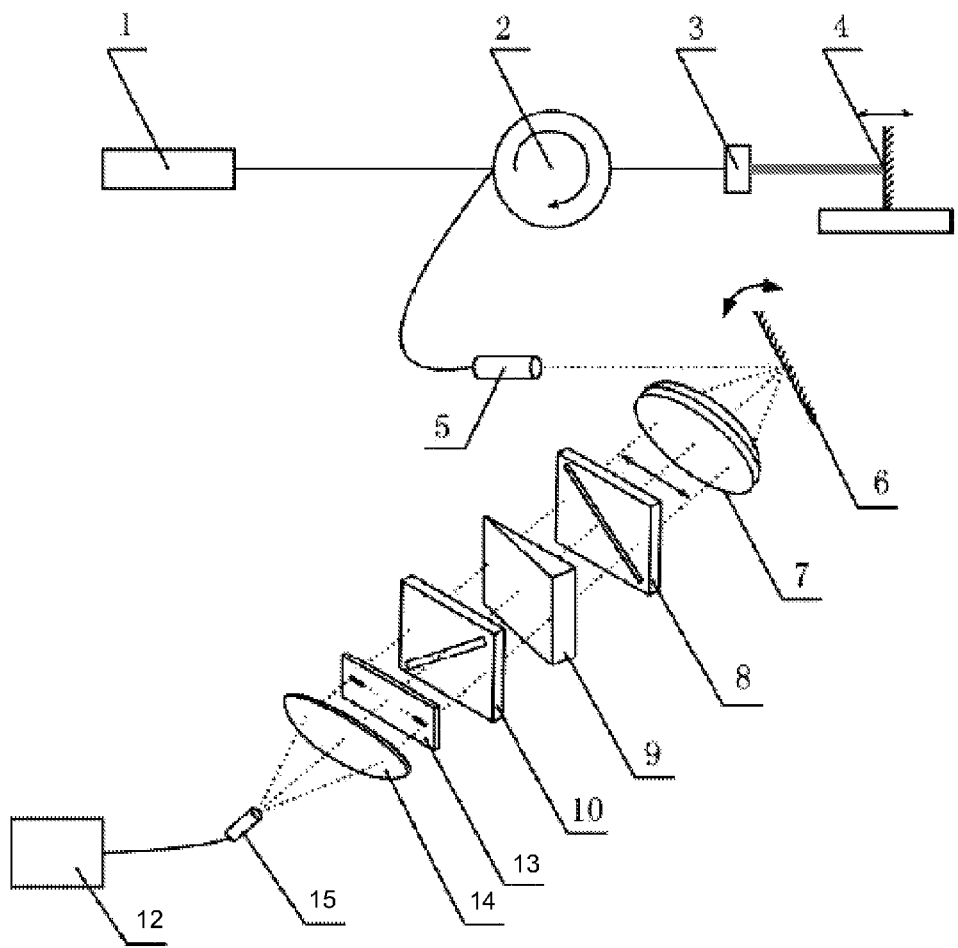
FIG. 2 is the schematic diagram of the second swing-style and high signal-to-noise ratio low coherence interference demodulation device for the measurement of displacement.

Embodiment 2: The second swing-style and high signal-to-noise ratio low coherence demodulation device for the measurement of interference displacement As shown in FIG. 2, the light from the broadband light source 1 passes through the optical circulator 2 and arrives at the GRIN lens 3.

Part of the light is reflected by the coated end surface of the GRIN lens 3, and the other part goes to the fixed mirror 4 installed on the test object. The two reflected light beams later are combined into one beam by optical fiber.

After passing through the optical circulator 2, part of the reflected light travels to collimating device 5 and turns into a thin light beam. The thin light beam is reflected by the rotating mirror 6 and travels through the f-θ lens 7, in which the reflection point of the rotating mirror 6 coincides with the focus of the f-θ lens 7.

By swinging the rotating mirror 6, the thin beam scans along the longitudinal direction of the narrow strip shaped birefringent wedge 9.

The light from the f-θ lens 7 incident to the polarizer 8 and forms a linearly polarized light beam, inclining 45° to the optical axis of optical wedge.

The linearly polarized light beam passes through the narrow strip shaped birefringent wedge 9 and arrives at the polarization analyzer 10 for projection interference.

The polarization analyzer 10 outputs interference signal lights after projection. The interference signal lights travel through the linear micropore array 13 into the focusing lens 14. The signal lights are converged to the focus of the focusing lens 14 and received by the PIN photoelectric detector 15. The electric signals converted from light signals are input to the computer 12.

The optical circulator described in Embodiments 1 and 2 can be replaced by optical fiber coupler when the power of light source is sufficiently large.

Embodiment 3: The demodulation method of the swing-style and high signal-to-noise ratio low coherence interference demodulation devices for the measurement of Displacement The method of the low coherence interference demodulation device for the measurement of displacement shown in Embodiment 1 can be described as follows.

As shown in FIG. 1, the light from the broadband source light 1 passes through the optical circulator 2 to the GRIN lens 3. One part of the light is reflected by the coated end surface of the GRIN lens 3. The other part of the light passes through the lens and arrives at the reflection mirror 4 fixed on the test object. These two reflected parts of the light are combined by a optical fiber. There is an optical path difference $d_s$ between the light reflected from the coated end surface of the GRIN lens and that from the fixed mirror on the test object, where $d_s$ equals twofold of the distance between the GRIN lens 3 and fixed mirror 4.

Figure 3:
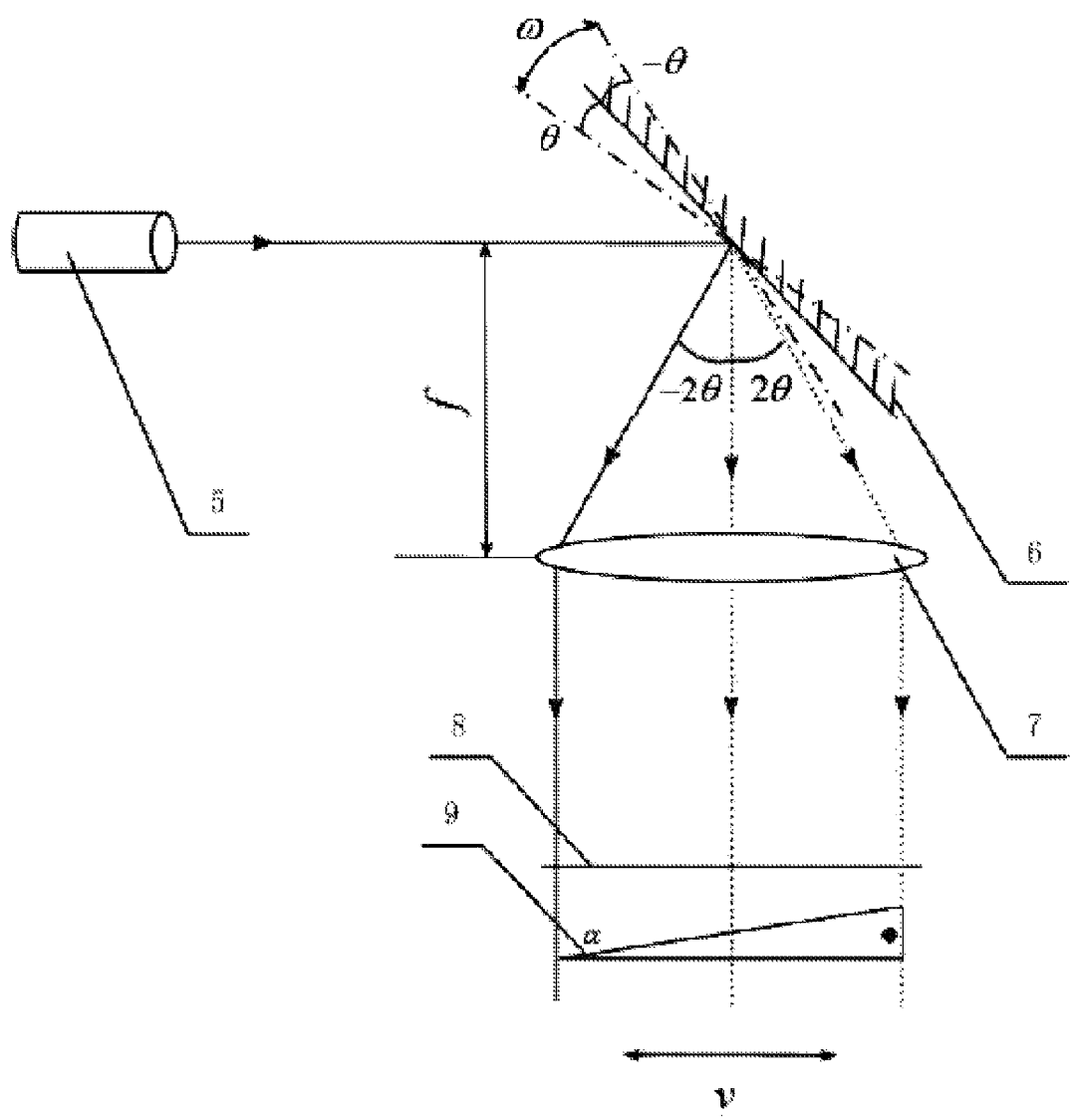
FIG. 3 is the schematic diagram of the scanning device, in which thin light beam travels along the longitudinal direction of the narrow strip shaped birefringent wedge.
Figure 4:
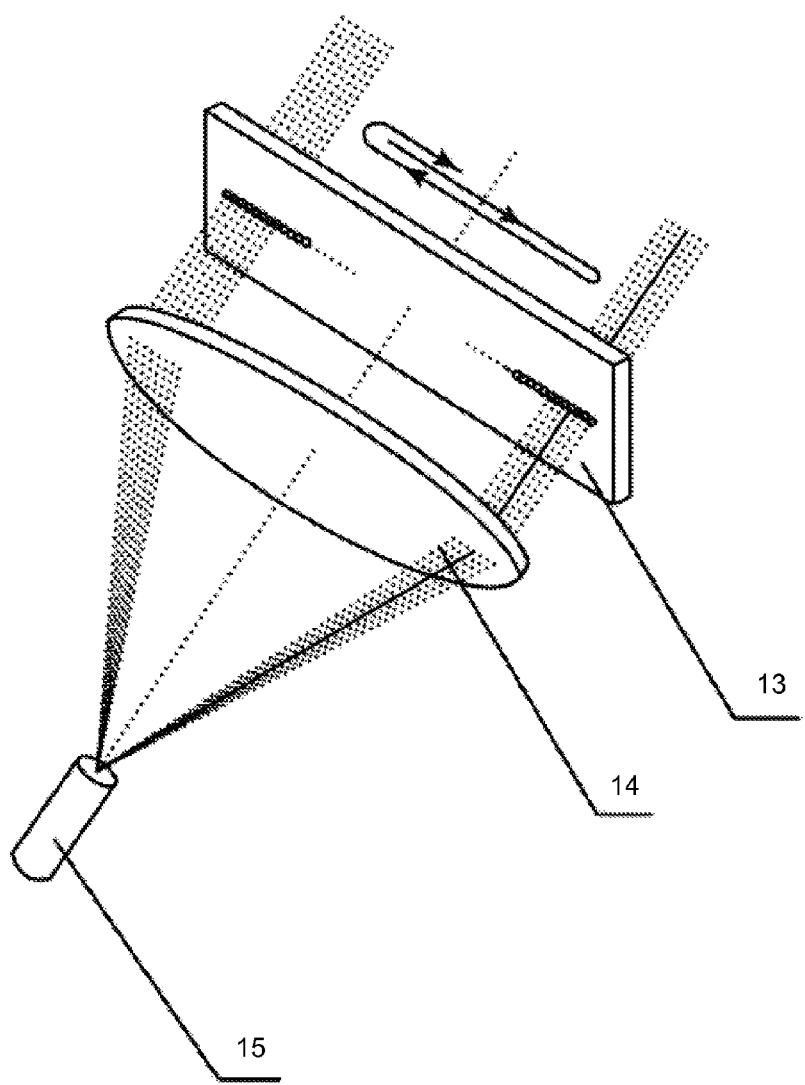
FIG. 4 is the schematic diagram of PIN photoelectric detector receiving interference fringes.

As shown in FIG. 3, the two reflected lights form a thin light beam, after passing through the optical circulator 2 and collimating device 5. The collimated thin light beam goes to a scanning device that comprises a rotating mirror 6 and a f-θ lens 7, in which the reflection point of the rotating mirror 6 consistently coincides with the focus of the f-θ lens 7. When the rotating mirror 6 swings at angular speed ω in the range of ±θ, the thin light beam scans in the range of ±2θ. After passing through the f-θ lens 7, the thin light beam parallel scans along the longitudinal direction of the narrow strip shaped birefringent wedge, at speed v and in the range of L=2f×tan(2θ). The value of L is adjusted by varying the swinging angle θ and the focal length f of the f-θ lens, to cover all pixels of the linear camera array and all the holes of the linear micropore array.

The signal light from the f-θ lens 7 is further processed into linearly polarized light via a polarizer 8, where the angle between the polarizing direction and the optical axis of the birefringent wedge is 45o. Then the narrow strip shaped birefringent wedge evenly turns the linearly polarized light beam into two orthogonal components, namely ordinary and extraordinary lights. An optical path difference $d_r=(n_e-n_o)d$ is formed between the two components, where $n_e$ is the optical refractive index of the extraordinary light, $n_o$ is the optical refractive index of the ordinary light. The narrow strip shaped birefringent wedge is designed to make $d(x)=x \tan \alpha$, where x is the lateral distance from the incident light to the birefringent wedge vertex, and α is the wedge angle (FIG. 3).

When the rotating mirror swings, the thin light beam scans along the longitudinal direction of the narrow strip shaped birefringent wedge, namely along the linear variation direction of optical path difference, from one end to the other. The optical path difference distribution is thus obtained. Since the thin light beam contains the information of the optical path difference relevant to the measurement, the scanning of the optical path difference is actually a process of signal matching. A high signal-to-noise ratio can be obtained after the projection of polarization analyzer 10, since the influence of outside noises on the thin light beam having a concentrated energy is negligible.

The low coherent interference signal acquisition methods of the two devices of this invention are different.

For the first device described in Embodiment 1, the interference fringes are received by the linear camera array 11 (e.g. linear CCD array). The scanned information can be input to the linear camera array 11 point-by-point, by synchronize the sampling frequency of the linear camera array 11, in order to achieve equal time interval for scanning from one end to the other of the optical wedge at every turn. Hence, each image of the linear camera array 11 presents the interference signals of one entire scan. Finally, the signals collected by the linear camera array 11 are input to computer 12 for data analysis to pick up the peak and calculate the displacement.

For the first device described in Embodiment 2, the interference information is received by PIN photoelectric detector 15. The light beams first pass through the linear micropore array 13, then focus to the PIN photodetector 15 using the focus lens 14. The signals collected by the PIN photodetector 15 are transferred to the computer 12 for data analysis. The PIN photodetector 15 receives a group of complete interference information, after each scan. By controlling the scanning start-stop time, a one-to-one relationship between each collected signal and the corresponding micropore can be established. The displacement information can thus be demodulated, by matching the commencing time of a interference signal and corresponding pore position in the micropore array.

Embodiment 4: an application example

When the GRIN lens 3 and fixed mirror 4 are used as the two reflecting surfaces of optical fiber Fabry-Perot, the developed demodulation devices and method of this invention are capable of demodulating the absolute cavity length of optical fiber Fabry-Perot.

The pressure sensor of optical fiber Fabry-Perot can be used as an illustration example. Install the fixed mirror 4 to the membrane and replace the GRIN lens 3 by optical fiber, as long as the cavity length of optical fiber Fabry-Perot is sufficiently short.

When the membrane deforms under external pressure, the fixed mirror 4 moves along the axial direction. The demodulation device can match the cavity length with the scanned optical path difference distribution, to calculate the deformation quantity of the membrane and the corresponding pressure value according to given formula or calibration coefficient.

What is claimed is:

1. A swing-style demodulation device for measuring displacement information, comprising (1) a broadband light source, (2) an optical circulator, (3) GRIN lens, (4) a fixed mirror on an object under test, (5) a collimating device, (6) a rotating mirror, (7) f-θ lens, (8) a polarizer, (9) a narrow strip shaped birefringent wedge, (10) a polarization analyzer, (11) a signal acquisition system, wherein a light goes from said broadband light source to said optical circulator and then to said GRIN lens, which reflects a first part of the light itself and transmits a second part of the light to said fixed mirror where said second part of the light is reflected and then combined with said first part of the light into a combined light, and said combined light goes back to said optical circulator, then in turn to said collimating device, said rotating mirror, said f-θ lens, said polarizer, said narrow strip shaped birefringent wedge, and finally said polarization analyzer which is connected to said signal acquisition system for calculating displacement information of said object under test.

2. The swing-style demodulation device of claim 1, wherein said signal acquisition system comprises a linear camera array and a computer or an embedded computing unit for processing electric signals from said linear camera array into displacement information of said object under test.

3. The swing-style demodulation device of claim 2, wherein said broadband light source is LED, SLD or halogen lamps.

4. The swing-style demodulation device of claim 2, wherein said linear camera array is a CCD linear array or CMOS linear array.

5. The swing-style demodulation device of claim 1, wherein said signal acquisition system comprises a micropore linear array, a focusing lens for focusing light beams after passing through said micropore linear array into focused optical signals, a PIN detector converting said focused optional signals into electric signals, and a computer or an embedded computing unit for processing said electric signals into displacement information of said object under test.

6. The swing-style demodulation device of claim 1, wherein said optical circulator is replaced by an optical fiber coupler.

7. A low coherence interference demodulation method, comprising the following steps: (1) passing light from a broadband source to an optical circulator and then to GRIN lens, where a first part of said light is reflected by a coated end surface of said GRIN lens and a second part of said light is transmitted to a reflection mirror fixed on an object under test; (2) combining said first part and said second part of said light, after being reflected, into a combined light and passing said combined light through said optical circulator; (3) collimating said combined light with a collimating device into a thin light beam and passing said collimated thin light beam to a scanning device that comprises a rotating mirror and f-θ lens, with the reflection point of said rotating mirror consistently coinciding with the focus of said f- lens; (4) passing the light from said f-θ lens through a polarizer and a narrow strip shaped birefringent wedge, where said polarizer turns the light into a linearly polarized light and said narrow strip shaped birefringent wedge evenly turns the linearly polarized light into two orthogonal components, being ordinary light beam and extraordinary light beams; (5) producing interference fringes by passing said two orthogonal linearly polarized light beams through a polarization analyzer; and (6) calculation displacement information of said object under test by passing electric signals of said interference fringes from said polarization analyzer to a signal acquisition system.

8. The method according to claim 7, wherein said signal acquisition system comprises a camera linear array coupled with a data processing unit for processing interference fringes generated by a visible broadband light source.

9. The method according to claim 7, where said signal acquisition system comprises a micropore linear array, a PIN photodetector, and a data processing unit for processing interference fringes generated by a near-infrared broadband light source.

* * * * *